US009009768B2

(12) United States Patent
Agnihotri et al.

(10) Patent No.: US 9,009,768 B2
(45) Date of Patent: Apr. 14, 2015

(54) MEDIA PLAYBACK CONTROL THROUGH REMOTE DEVICE CONTROL

(75) Inventors: Tanmay Agnihotri, San Diego, CA (US); Guru Prashanth Balasubramanian, San Diego, CA (US); Kalyana Kota, San Diego, CA (US)

(73) Assignee: Sony Corporation, Tokyo (JP)

( * ) Notice: Subject to any disclaimer, the term of this patent is extended or adjusted under 35 U.S.C. 154(b) by 542 days.

(21) Appl. No.: 13/100,258

(22) Filed: May 3, 2011

(65) Prior Publication Data

US 2012/0117179 A1    May 10, 2012

Related U.S. Application Data

(60) Provisional application No. 61/411,112, filed on Nov. 8, 2010.

(51) Int. Cl.
| G06F 15/16 | (2006.01) |
| H04N 7/173 | (2011.01) |
| G08C 17/00 | (2006.01) |
| H04L 12/28 | (2006.01) |
| H04N 21/472 | (2011.01) |
| H04N 5/44 | (2011.01) |

(52) U.S. Cl.
CPC .............. *G08C 17/00* (2013.01); *H04L 12/2803* (2013.01); *H04N 21/47217* (2013.01); *H04N 5/4403* (2013.01); *G08C 2201/40* (2013.01); *G08C 2201/42* (2013.01)

(58) Field of Classification Search
CPC .................. G06C 2201/40; G06F 2203/0383; H04L 12/2803; H04L 12/2805; H04N 21/47217; H04N 5/4403
USPC ........................... 709/246; 348/734; 725/102
See application file for complete search history.

(56) References Cited

U.S. PATENT DOCUMENTS

| 6,008,777 A * | 12/1999 | Yiu ................................ 345/2.1 |
| 6,008,921 A * | 12/1999 | Brusky et al. ................. 398/106 |
| 6,144,376 A | 11/2000 | Connelly |
| 6,208,384 B1 | 3/2001 | Schultheiss |
| 6,262,713 B1 | 7/2001 | Brusky et al. |
| 7,102,691 B2 * | 9/2006 | Dischert et al. ............... 348/552 |
| 7,954,128 B2 * | 5/2011 | Maynard et al. ................ 725/88 |
| 2002/0068558 A1 * | 6/2002 | Janik ............................. 455/422 |
| 2005/0120382 A1 * | 6/2005 | Tang ............................. 725/109 |
| 2005/0219424 A1 * | 10/2005 | Ryu .............................. 348/734 |
| 2008/0098426 A1 * | 4/2008 | Candelore ....................... 725/38 |
| 2008/0291074 A1 * | 11/2008 | Tzeng et al. .................. 341/176 |
| 2008/0294667 A1 * | 11/2008 | Kopf ............................. 707/101 |
| 2009/0300699 A1 * | 12/2009 | Casagrande et al. .......... 725/116 |
| 2010/0208147 A1 * | 8/2010 | Kimura ......................... 348/734 |
| 2010/0268761 A1 * | 10/2010 | Masson ......................... 709/203 |

* cited by examiner

*Primary Examiner* — Aaron Strange
(74) *Attorney, Agent, or Firm* — Fitch, Even, Tabin & Flannery LLP

(57) ABSTRACT

Methods and systems are provided for establishing a connection with a first processor-based device at a second processor-based device, receiving through the connection a control command from the first processor-based device implemented according to a first protocol, wherein the command corresponds to a remote control command received through a remote control device at the first processor-based device, translating the control command from the first protocol to a second protocol executable at the second processor-based device, and executing an event in response to the control command having been translated into the second protocol.

10 Claims, 9 Drawing Sheets

| Command | WMP | VLC Player |
|---|---|---|
| Play/Pause | Ctrl + P | 'Space Bar' |
| Stop | Ctrl + S | s |
| Full Screen | Alt + Enter | f |
| Next Item or Chapter | Ctrl + F | n |
| Previous Item or Chapter | Ctrl + B | p |
| Fast Forward | Ctrl + Shift + F | Shift +-> |
| Rewind | Ctrl + Shift + B | Shift +<- |
| Mute Sound | F7 | m |

*FIG. 7*

MEDIA PLAYBACK CONTROL THROUGH REMOTE DEVICE CONTROL

This application claims the benefit of U.S. Provisional Application No. 61/411,112, filed Nov. 8, 2010, entitled "PC MEDIA PLAYBACK CONTROL USING SONY REMOTE", which is incorporated in its entirety herein by reference.

BACKGROUND OF THE INVENTION

Owing to their support for the various media formats and storage capabilities, computers have become a convenient option for viewing stored movie content. However, the viewing experience is incomplete or even stressful, due to the limited screen sizes of the computer monitors, especially when compared to the display devices most consumers have in their living rooms. In addition, desktop computers (computing systems) are usually located on a desk or table, away from couches and other comfortable furniture most suited for extended viewing. While laptops solve the mobility issue, their smaller screen sizes make movie viewing from a distance extremely difficult. In this scenario, the only way to watch them on display device is to play them on the computing system, and then connect the computing system output to display device using the VGA/HDMI/S-Video input.

While, there are many ways of playing media from a computing system on the display device, typically if the user is watching a movie from a computing system connected to the display device, via HDMI or S-Video, VGA, or any other similar means, the only way to perform any of the playback-related operations (such as fast-forward/rewind/pause) is by going to the computing system and controlling them directly through the computer input.

SUMMARY OF THE INVENTION

Several embodiments of the invention provide a method comprising establishing a connection with a first processor-based device at a second processor-based device, receiving through the connection a control command from the first processor-based device implemented according to a first protocol, wherein the command corresponds to a remote control command received through a remote control device at the first processor-based device, translating the control command from the first protocol to a second protocol executable at the second processor-based device, and executing an event in response to the control command having been translated into the second protocol.

In one embodiment, the invention can be characterized as a processor based device comprising a network interface module configured to establish a connection with an external device and further configured to receive through the connection a control command from the external device implemented according to a first protocol, wherein the command corresponds to a remote control command received through a remote control device at the external device, a command module configured to translate the control command from the first protocol to a second protocol executable at the processor-based device, and one or more media player applications configured to execute an event in response to the control command having been translated into the second protocol.

In another embodiment, the invention can be characterized as a tangible non-transitory computer readable medium storing one or more computer readable programs adapted to cause a processor based system to execute steps comprising establishing a connection with a first processor-based device at a second processor-based device, receiving through the connection a control command from the first processor-based device implemented according to a first protocol, wherein the command corresponds to a remote control command received through a remote control device at the first processor-based device, translating the control command from the first protocol to a second protocol executable at the second processor-based device, and executing an event in response to the control command having been translated into the second protocol.

BRIEF DESCRIPTION OF THE DRAWINGS

The above and other aspects, features and advantages of several embodiments of the present invention will be more apparent from the following more particular description thereof, presented in conjunction with the following drawings.

FIG. 7 is an exemplary embodiment of a look up table according to several embodiments of the present invention.

Figure 1:
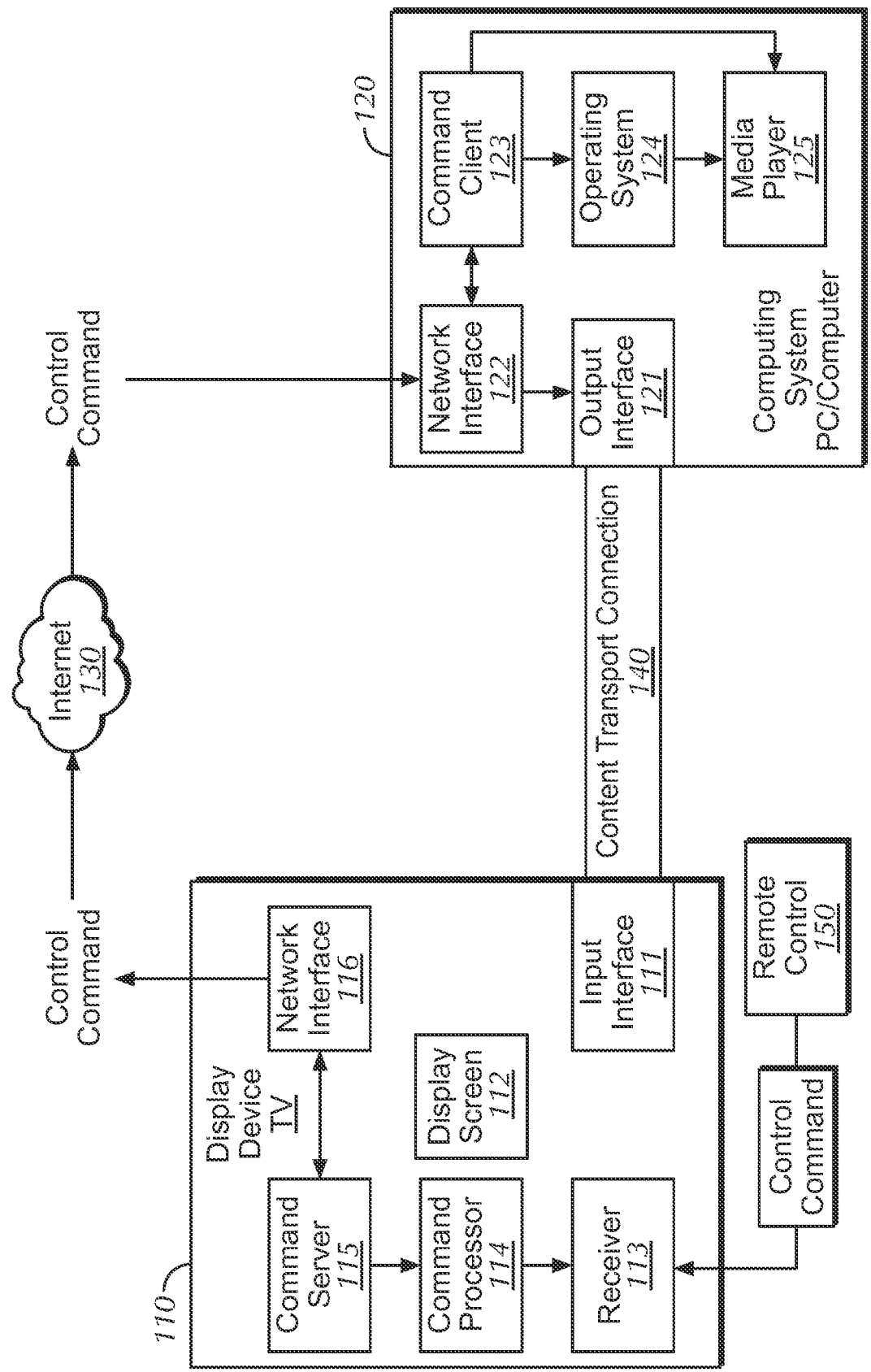
FIG. 1 is a block diagram of the overall system structure for implementing one or more of the techniques and methods of the present invention, according to several embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Computing systems provide a convenient option for viewing multimedia and other content due to their support for the various media formats and storage capabilities. However, the viewing experience is incomplete or even stressful, due to the limited screen sizes of the computer monitors, especially when compared to the display devices most consumers have in their living rooms. In addition, desktop computers (computing systems) are usually located on a desk or table, away from couches and other comfortable furniture most suited for extended viewing. While laptops solve the mobility issue, their smaller screen sizes make movie viewing from a distance extremely difficult. To allow for comfortable viewing while taking advantage of the advantages provided by a computing system, the computing system may be connected to display devices and media playing on the computing system can be viewed comfortably on display device by connecting the computing system output to display device using, for example, the VGA/HDMI/S-Video input.

However, when the user is viewing the content from a computing system connected to the display device, via HDMI, S-Video, VGA, or any other means, the only way to perform any of the playback-related operations (such as fast-forward/rewind/pause) is by going to the computing system and controlling the operations directly through the computer input means. While connecting the computing system output to the television allows movies to be played on the larger screen of the television, whenever users wish to pause or rewind or otherwise alter the playback of a movie, they are forced to get up and go to the computing system. Other options include a wireless keyboard or mouse or a media center computing system requiring an extra remote. This is very inconvenient for the user and can disrupt the movie watching experience. Furthermore, where wireless control means for the computing system such as a wireless keyboard or mouse are used, the range of control is limited and the keyboard or mouse needs to be used in addition to the remote control of the display device the viewing is taking place on. Further, the user must be familiar with the specific controls of the media player on the computing system. The result is a sub-optimal viewing experience.

The present invention provides a system to allow a user/viewer to control the computing system's playback operations through the display device remote control. In one embodiment, an Internet Protocol-based system is provided to control the computing system through the display device remote control.

In one or more embodiments, the system employs a socket-based application installed on the computing system to enable computing system Media Playback control. In one embodiment the application may compromise a VC++ application. Furthermore, in some embodiments, the display device is provided with a TCP server to provide a connection means to the computing system.

The proposed application allows control of computing system media playback from the display device remote control device seamlessly, much like a normal television experience. Controlling content rendering from the display device's remote control removes the need for the viewer to go over to the computing system thereby providing for an optimal viewing experience. The application further provides greater ease of use than using a pointing device of the computing system (e.g., the computer mouse) as no extra hardware is involved and the display device remote is the single point for media playback control on the display device.

Referring to FIG. 1, a block diagram of the overall system structure for implementing one or more of the techniques and methods of the present invention is illustrated.

As shown, the environment comprises a display device 110 and a computing system 120. In one embodiment, as shown, the display device 110 and computing system 120 are communicatively coupled through a content transport connection 140. Additionally, according to several embodiments, the display device 110 and computing system 120 are further communicatively coupled through a network 130. In one embodiment, the display device is further communicatively coupled to a remote control 150.

In one embodiment the display device 110 may comprise a television, projection display, and/or any other display device having connection means for receiving content input from a computing system and a display screen 112 for displaying the content. In one embodiment, as shown, the display device 110 comprises an input interface 111, a display screen 112, a receiver 113, a command processor 114, a command server 115, and a network interface 116.

The input interface 111 is communicatively coupled to the content transport connection 140 and configured to receive media content from the computing system 120. In one embodiment, the input interface is configured to forward the media to be played back at the display screen 112. In one embodiment, the input interface may provide the content to a processor at the display device for processing before the content is sent to the display screen 112. The processor may be integrated with the input interface 111, display screen 112 and/or may be a separate from and communicatively coupled to the input interface and display screen. The receiver 113, in one or more embodiments, is configured to receive control commands from the remote control 150 and forward the commands to a command processor 114 for processing. In one embodiment, the command processor 114 may be configured to determine the source of content being displayed on the display screen 112. For example, in one embodiment, the command processor may determine that the command received from the receiver 113 comprises a command to control playback of content received from the computing system 120 and received at input interface 111.

If the command processor determines that the command from the remote control is intended to control media playback for content being received from the computing system 120, in one embodiment, the command processor 114 is configured to translate the remote control command to TCP data and forward the TCP data to the command server 115. In one embodiment, alternatively, the command processor may forward the control command from the controller to the command server 115 and one or more of the processing steps may be performed at the command server 115.

Upon receiving and/or processing the TCP data corresponding to the control command received from the remote control 150, the TCP data is then forwarded to the network interface 116. In one embodiment, the network interface 116 may comprise and/or be coupled to communication means such as a receiver/transceiver and in communication with network 130. The network interface 116 forwards the TCP data corresponding to the control command to the Network 130. According to one embodiment, the network interface 116 is connected to network 130 by wired or wireless means. In one embodiment, the network interface may comprise a modem for facilitating communication with the network 130.

The computing system may comprise a personal computer (computing system), a mobile device, a tablet device, a game console, and entertainment device and/or other device having browser and/or media player capabilities. As illustrated in FIG. 1, the computing system 120 comprises one or more modules and/or applications comprising an output interface 121, a network interface 122, a command client 123, an operating system 124 and a media player 125. In one embodiment, the output interface 121 is configured to forward media content to be displayed at the display device through the content transport connection. That is, the output interface provides a communicational coupling between the computing system 120 and the display device 110. In one embodiment, the output interface may comprise a USB, mini display port, display port and/or other port at the computing system for receiving the content transport connection 140 and for providing content to the display device. In another embodiment, the output interface 121 may comprise a wireless connection means for connecting to the display device and for forwarding media content to the display device 110.

In addition to the output interface 121, in one or more embodiments, the computing system is further in communication with the display device through network interface 122. As shown in FIG. 1, in several embodiments, the network interface 122 is configured to establish a connection with the display device 110 through the network 130 and further configured to receive media player control commands from the display device 110 through the connection. In one embodiment, for example, the connection comprises a TCP connection and the media player commands may comprise TCP data corresponding to the control command received from the remote control 150 at the display device 110. In one or more embodiments, the network interface 122 is further configured to send an acknowledgement to the display device upon receiving the media player control commands and/or upon the command being executed at the computing system.

The command client 123 is in communication with the network interface and configured to receive the media player commands. In one embodiment, upon receiving the media player control command the command client 123 detects an active media player application running at the computing system and translates the media player control command to a control command for the specific media player application. That is, the media player application may comprise any application either installed on the computing system 120 and/or accessed through a browser at the computing system. In one embodiment, each player application may comprise one or more commands implemented in a specific protocol and/or platform, and the command client 123 is configured to determine the appropriate command and/or commands executable at the media player application and forward the one or more commands to the active media player application.

Alternatively, in one embodiment, instead of being communicatively coupled to the media player module 125, the command client is coupled to the operating system 124. In one embodiment, one or more of the processing steps including the determining the active media player application and the translation of the media player control command may be performed at the operating system 124. That is, in some instances, upon receiving the media player control command, the command client forwards the media player control command to the operating system for processing. In another embodiment, the command client may process the command and translate the command into a media player specific command and may then forward the translated command to the operating system 124. In one or more embodiments, the operating system is configured to then send the executable command to the active media player application to be executed.

The media player module 125 comprises one or more media player applications for accessing and/or playing media content. In one embodiment, the media player module 125 comprises an active media player application playing media content at the computing system. According to the several embodiments, the media content of the active media player application is sent to display device 110 through the content transport connection to be displayed at display screen 112. The active media player application is configured to receive the executable control command or commands from the command client 123 and or operating system 124 and to execute an event in response to the command. In one embodiment, the event comprises simulating a function at the active media player application corresponding to the remote control command received at the display device.

In one embodiment, the executable command may comprise a keyboard or mouse event. For example, when simulating control of the mouse, remote control inputs such as navigation key inputs are detected at the display device and sent to the computing system as TCP data. The data is converted into Windows or other platform specific mouse events using system calls such as mouse_event( ) to simulate playback or control functions typically performed through inputs received through the mouse, e.g. to navigate and/or click on the computing system screen. Similarly, when controlling or simulating functions performed by the computer keyboard, remote control inputs are detected at the display device and sent to the computing system as TCP data. The data is converted into Windows or other platform specific keyboard events using system calls such as keyboard_event( ) to simulate a playback function typically performed through inputs received through the keyboard.

In one embodiment, the network 130 may comprise an internet, intranet, Local Area Network (LAN), power network, or any type of network known in the art for communicating data. While, the control command data is described as being formatted as TCP data to be communicated over network 130, it should be appreciated by one skilled in the art that alternative data protocols may be used for sending the control command over the network depending on the type of network and the capabilities of the display device 110 and/or computing system 120.

In one embodiment, the display device 110 and computing system 120 are further coupled through the content transport connection 140. In one embodiment, the content transport connection may comprise HTTP, VGA, HDMI, S-Video and/or other similar connection means. In one embodiment, as shown, the content transport connection is coupled to the input interface 111 at the display device and the output interface 121 at the computing system. According to one embodiment, the content transport connection comprise a cord, connector and or other means for receiving media content from the computing system 120 and providing the media content to be displayed at the display device 110. In one embodiment for example, the computing system may be connected to the display device through a wired or wireless connection configured to transfer media content.

In one embodiment, the remote control device 150 may comprise any wired or wireless remote control device configured to send remote control media rendering commands to the display device. In one embodiment, the media rendering control commands are executable at the television to perform a function related to retrieving, rendering or playback of media content. In one embodiment, the remote control device may comprise a television remote control, a universal remote control, a game controller, etc.

Figure 2:
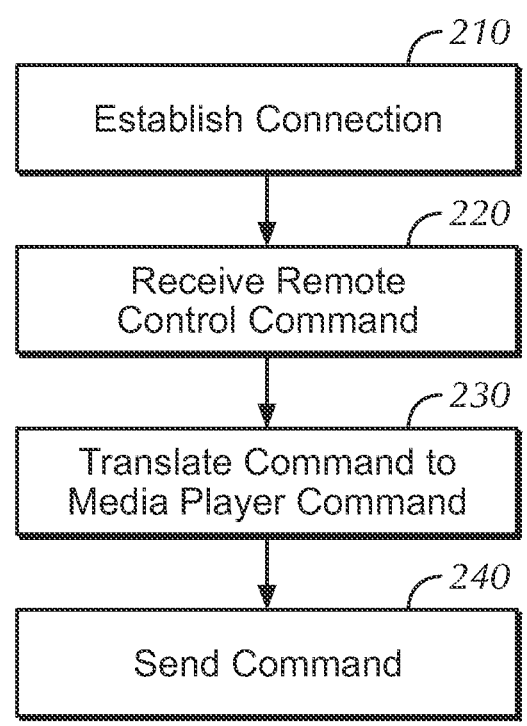
FIG. 2 is a high level flow diagram of a method performed at a display device, according to several embodiments of the present invention.

FIG. 2 illustrates a high level flow diagram of a method performed at the display device 110, according to several embodiments of the present invention.

The process begins in step 210, when a viewer of the display device chooses to view content from a computing device connected to the display device through a connection means. In step 210, the display device 110 establishes a connection with the computing system 120. In one embodiment, once the display device is in HDMI/VGA/S-Video mode, the user may choose to control the computing system media playback and enter the IP address of the computing system at the display device to enable communication between the computing system and the display device.

In some embodiments, the viewer has access to the IP address or some other identifier means of one or both the display device and computing system and may enter the IP address of the computing system to establish the connection. In another embodiment, upon connecting the display device to the computer via VGA, HDMI, S-video or other means, the display device may automatically query the computing system 120 for the IP address information and may initiate a request to establish the connection. In yet another embodiment, upon connecting the display device to the computing system 120 via VGA, HDMI, S-video or other means, the computing device may automatically query the display device 110 for the IP address or other identifier information and may initiate a request to establish the connection.

Upon establishing the connection, in one embodiment, the display device may open a TCP socket and connect to the computing system 120 using a specified port. In one embodiment, the computing system, through the network interface 122, will listen on the specified port for communication from the display device. According to one or more embodiments, the computing system 120 and display device are connected to the same network 130.

Thus, the communication is established the display device 110 begins monitoring for media rendering remote control commands. Once the display device remote control 150 issues Media rendering control commands, the display device detects the remote control command in step 220 and continues to step 230.

In one embodiment, in step 230, the display device 110 converts the remote control commands to media player commands that can be sent to the computing system 120 over the connection. For example, in one embodiment, the display device 110 converts the remote control signals to TCP data. In one embodiment, for example, the remote control commands are implemented in Sony Integrated Remote Control Systems (SIRCS) protocol. In such embodiments, SIRCS commands from the remote control are converted into TCP data.

Next, in step 240, the display device sends the media player control command over the network connection. For example, in one embodiment the display device 110 forwards the TCP data to the computing system using the connection port, i.e. the TCP socket.

Figure 3:
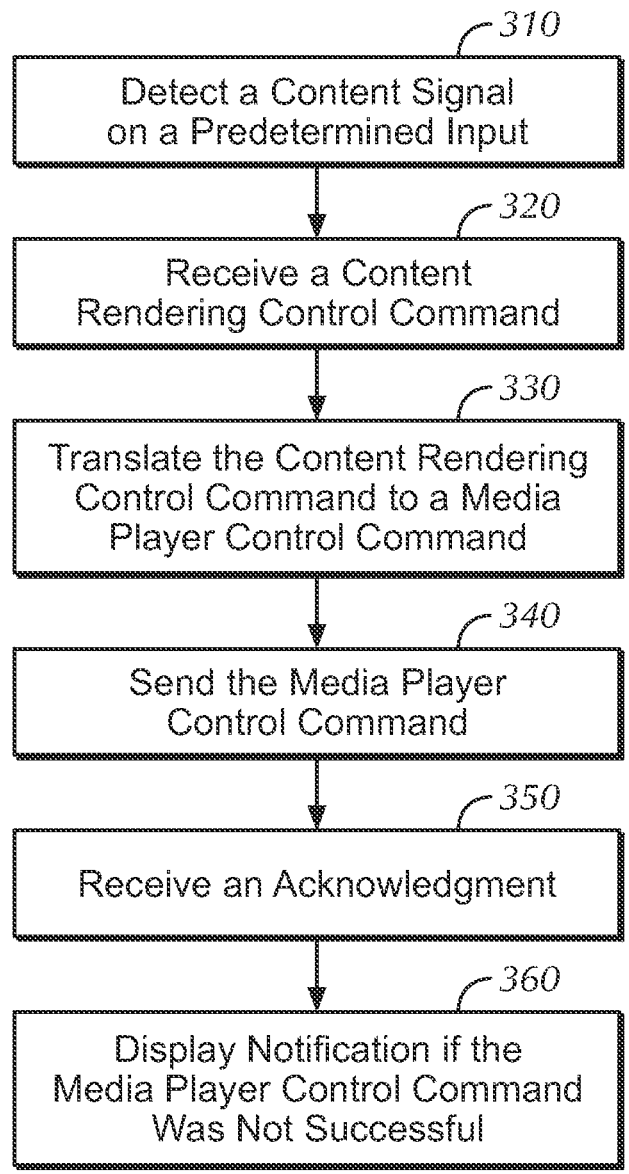
FIG. 3 is a more detailed flow diagram of the process for receiving media rendering remote control commands at the display device, and forwarding media player commands to a computing system for controlling media playback at the computing system, according to several embodiments of the present invention.

FIG. 3 illustrates a more detailed flow diagram of the process for receiving media rendering remote control commands at the display device, and forwarding media player commands to the computing system for controlling media playback at the computing system, according to several embodiments of the present invention.

First, in step 310, the display device detects a content signal on a predetermined input. For example, in one exemplary embodiment, the display device detects media content at the input interface 111. In one embodiment, the content signal comprises media content being sent from the computing system 120 through content transport connection 140. In one embodiment, the content transport connection may comprise HTTP, VGA, HDMI, S-Video and/or other similar connection means. In one embodiment, as shown, the connect transport connection is coupled to the input interface 111 at the display device and the output interface 121 at the computing system and is configured to transfer media content playing at the computing system 120 to the display device 110 to be displayed.

In one embodiment, in step 310, a viewer of the display device chooses to view content from a computing system/device connected to the display device through the content transport connection. In one embodiment, upon coupling the display device and computing device through a data transfer connection means such as HDMI, VGA, S-video, or other means, the content being played at a media player of the computing system is transferred to the display device 110. In one embodiment, the detected content signal is displayed on the display screen 112 of the display device 110.

In one embodiment, once the display device is in HDMI/VGA/S-Video or other data transfer mode, the user may choose to control the computing system media playback and enter the IP address of the computing system at the display device to enable communication between the computing system and the display device. According to one or more embodiments, the computing system 120 and display device are connected to the same network 130. In some embodiments, the viewer has access to the IP address of both the display device and computing system and may enter the IP address of the computing system to establish the connection. In another embodiment, upon connecting the display device to the computing system 120 via VGA, HDMI, S-video or other means, the display device may automatically query the computing system 120 for the IP address information and may initiate a request to establish the connection.

Upon establishing the connection, in one embodiment, the display device may open a TCP socket and connect to the computing system 120 using a specified port or vice versa. In one embodiment, the computing system, through the network interface 212, will listen on the specified port for communication from the display device. Once the communication is established the display device 110 begins monitoring for media rendering remote control commands.

Next, in step 320, the display device receives a content rendering control command issued by the display device remote control 150. In one embodiment, for example, the remote control commands are implemented in Sony Integrated Remote Control Systems (SIRCS) protocol.

Next, in step 330 the display device translates the content rendering control command to a media player control command. For example, in one embodiment, in step 330, the display device 110 converts the remote control commands to media player commands that can be sent to the computing system 120 over the connection. For example, in one embodiment, the display device 110 converts the remote control signals to TCP data. In one embodiment, for example, the remote control commands are implemented in Sony Integrated Remote Control Systems (SIRCS) protocol. In such embodiments, SIRCS commands from the remote control are converted into TCP data.

Next, in step 340, the display device sends the media player control command over the network connection. For example, in one embodiment the display device 110 forwards the TCP data to the computing system using the connection port, i.e. the TCP socket and may begin monitoring for an acknowledgment message from the network 130 and/or computing system 120. In one embodiment, the acknowledgment message may comprise an acknowledgment that the control command was received at the computing system and/or that the function corresponding to the control command was performed at the computing system.

Upon receiving the acknowledgment, in step 350, the display device 110 may process the acknowledgment to determine whether the message was received, and further whether the function corresponding to the content was successfully performed at the computing device.

In one embodiment, when the device determines that the function is not performed, in step 360 the device may display a notification to the viewer that the media player control command was not successful. In one embodiment, the message may comprise text or audio presented to the viewer through the display screen 112 or other output means such as a microphone coupled to the display device. In a further embodiment, during step 360, the display device may similarly issue a notification when the function is performed. For example, in one embodiment, a text or audio may appear notifying the user that the command was received at the computing system, and/or performed.

In another embodiment, the function carried out at the computing system may cause some change in the media playback experience at the display device, such that it signals to the user whether the command was successful. For example, in one embodiment, where the user chooses to click on a pause button or pause playback, if the playback is paused for content being displayed on the display screen 112 then the viewer will know that the control command was successfully received and performed at the computing system 120.

Figure 4:
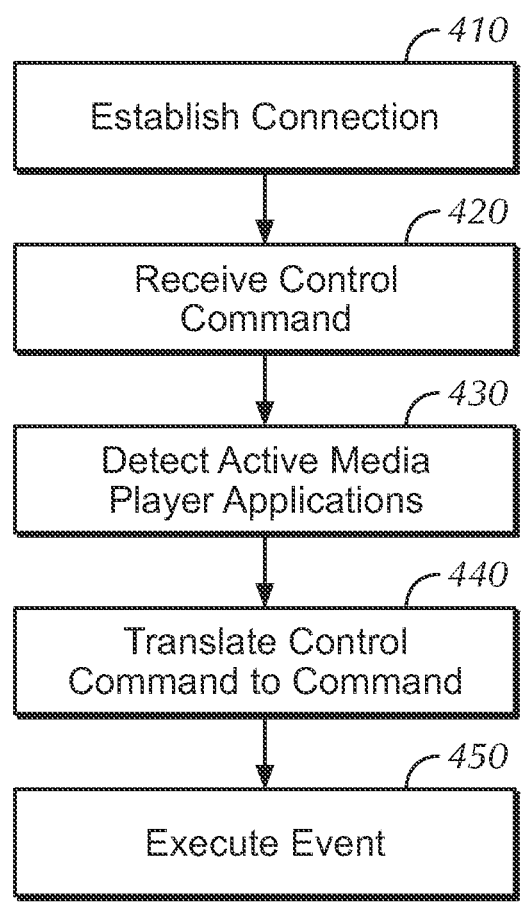
FIG. 4 is a high level flow diagram of a method performed at the computing system, according to several embodiments of the present invention.

Next, referring to FIG. 4, a high level flow diagram of a method performed at the computing system 120 is illustrated according to several embodiments of the present invention.

First, in step 410, the computing system establishes a connection with a display device 110 having a display for displaying content being played at the computing system/device. In one embodiment, prior to step 410 a viewer of the display device chooses to view content from a computing device connected to the display device through a connection means. In one embodiment, once the display device is coupled to the computing system 120 and in HDMI/VGA/S-Video or other media transfer mode, the user may choose to control the computing system media playback and enter the IP address of the computing system at the display device to enable communication between the computing system and the display device. For example, in some embodiments, the viewer has access to the IP address of both the display device and computing system and may enter the IP address or some other identifier of the computing system to establish the connection. In another embodiment, the viewer may enter the IP address or some other identifier of the TV at the computing system 120 to initiate the connection.

In another embodiment, upon connecting the display device to the computing system 120 via VGA, HDMI, S-video or other means, the computing system 120 may automatically query the display device 110 for the IP address or other identifier information and may initiate a request to establish the connection. In yet another embodiment, the display device may instead query the computing device for identifier information and begin establishing the communication.

Upon establishing the connection, in one embodiment, the display device and/or computing device may open a TCP socket and connect to connect to one another through a specified port. In one embodiment, the computing system application will listen on the specified port for communication from the display device.

Next, in step 420, the computing device may receive a media player control command. In one embodiment, the media player control command may comprise TCP data received through the communication port. In one embodiment, upon receiving the media player control command the computing system continues to step 430 and begins processing the command.

For example, in one embodiment, upon receiving the command, e.g. TCP data, the computing system identifies the media player application currently running at computing system, e.g., WMP, VLC, etc, in step 430, Next, in step 440, according to the determination, the computing system identifies appropriate commands to perform the function associated with the media player control command, e.g. TCP data, based on the identified player application. In one embodiment, for example, the computing system determines the appropriate media player application, brings the media player application's interface to the foreground of the desktop and transmits the specified commands to control the media playback of the identified application. In one embodiment, during step 440 the computing system translates the control command to an executable command for the active media player application.

In one embodiment, the translation process of step 440 may comprise receiving the media player command through the network interface and accessing a lookup table for the specific active application, to determine one or more executable commands associated with the active media player.

FIG. 7 illustrates an exemplary embodiment of a look up table according to one embodiment of the present invention. As illustrated the look up table includes a list of possible media player commands that may be received from the display device 110 and further includes one or more commands for each specific player application available at the computing system, which correspond to each of the one or more possible media player control commands. In one or more embodiments, the look up table may be created upon connection initialization, at the time of installing the application for performing the commands at each of the display device and the computing device and/or at any other time prior to performing the translation step.

In one embodiment, the look up table may further be updated periodically. The media player commands within the lookup table correspond to possible remote control commands that may be received from the remote control device 150. As shown, the translated commands may comprise one or more of keyboard events and/or mouse events.

Upon determining the appropriate commands, the commands are forwarded to the media player application for executing and the process continues to step 450. During step 450 the active media player receives the one or more executable commands and executes an event in response to the received control commands. In one embodiment, the event comprises simulating a function corresponding to the remote control command received at the display device 110 through remote control device 150. In one or more embodiments the event comprises a mouse or keyboard event causing the active media player to simulate a function typically performed by a mouse or keyboard input at the computing device.

For example, when simulating control of the mouse, remote control inputs such as navigation key inputs are detected at the display device and sent to the computing system as TCP data. The data is converted into Windows or other platform specific mouse events using system calls such as mouse_event( ) to simulate playback or control functions typically performed through inputs received through the mouse, e.g. to navigate and/or click on the computing system screen. Similarly, when controlling or simulating functions performed by the computer keyboard, remote control inputs are detected at the display device and sent to the computing system as TCP data. The data is converted into Windows or other platform specific keyboard events using system calls such as keyboard_event( ) to simulate a playback function typically performed through inputs received through the keyboard.

Using the determined commands the present system enables control of computing system media playback using the display device's remote control. This application thus ensures that a user accessing media from their computing system 120 using means such as HDMI/VGA/S-Video to control playback of such media through interaction with the display device rather than the computing system, while watching media content.

Figure 5:
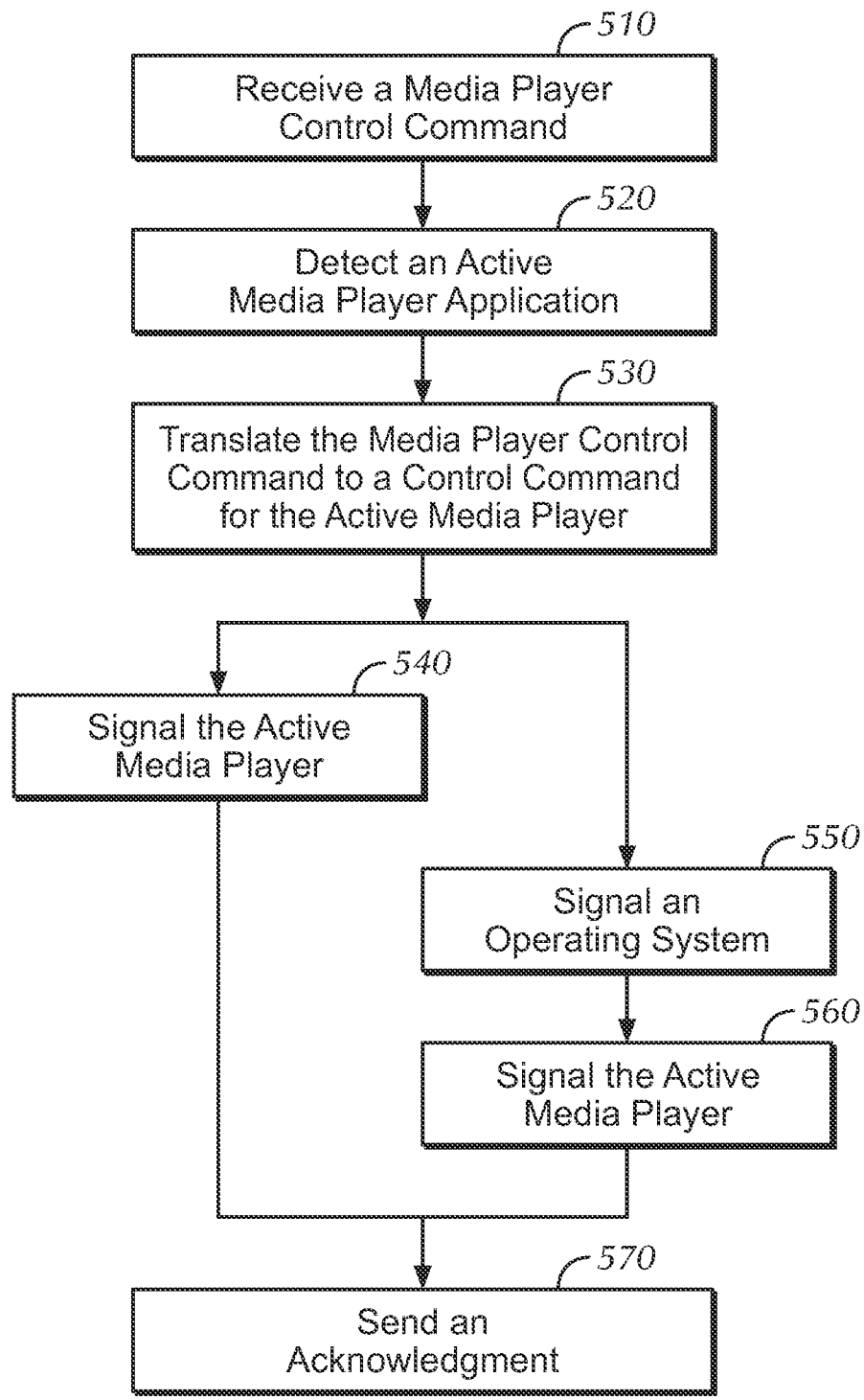
FIG. 5 is a more detailed flow diagram of a process for controlling media playback at the computing system in response to a media player control commands received from a display device, according to several embodiments of the present invention.

FIG. 5 illustrates a more detailed flow diagram of a process for controlling media playback at the computing system in response to a media player control commands received from a display device, according to several embodiments of the present invention.

The process begins in step 510, when computing system 120 receives a media player control command. In one embodiment, the media player control command may comprise TCP data or other command data received through the network interface 122 of the computing system.

Upon receiving the media player control command the computing system continues to step 520 and detects an active media player application currently running at the computing system. For example, in one embodiment, upon receiving the command, e.g. TCP data, the computing system identifies the media player application currently running at computing system, e.g., WMP, VLC, etc.

Next, in step 530, according to the determination of the active media player application, the computing system translates the media player control command to a control command for the active media player. In one embodiment, the translation step is performed by the command client 123. In one embodiment, for example, the command client 123 identifies appropriate commands to perform the function associated with the media player control command, e.g. TCP data, based on the identified player application. In one embodiment, for example, the computing system determines the appropriate media player application, brings the media player application's interface to the foreground of desktop and transmits the specified commands to control the media playback of the identified application. In one embodiment, during step 430 the computing system translates the control command to one or more executable commands for the active media player application.

In one embodiment, the translation process may comprise accessing a lookup table to determine one or more executable commands associated for the specific active media player application. FIG. 7 illustrates an exemplary embodiment of a look up table according to one embodiment of the present invention. As illustrated the look up table includes a list of possible media player commands that may be received from the display device 110 and further includes one or more commands for each specific player application available at the computing system, which correspond to each of the one or more possible media player control commands.

In one or more embodiments, the look up table may be created upon connection initialization, at the time of installing the application for performing the commands at each of the display device and the computing device and/or at any other time prior to performing the translation step. In one embodiment, the look up table may further be updated periodically. In one embodiment, the media player commands within the lookup table correspond to possible remote control commands that may be received from the remote control device 150. As shown, the translated commands may comprise one or more of keyboard events and/or mouse events. In one embodiment, upon determining the appropriate commands, the commands are forwarded to the media player application.

Next, in step 540, the command client signals the active media player and the one or more executable control commands are forwarded to the active media player application for executing. In an alternative embodiment as describe above, the command client 123 may not be directly coupled to the media player module. For example, when the media player is accessed through a browser application, the command client 123 may be in communication with the media player through the operating system 124. In such embodiments, instead of continuing to step 540, the command client upon translating the media player control command signals the operating system 124 during step 550, which then communicates with the media player in step 560.

In either embodiment, upon signaling the active media player, in step 540 or 560, the active media player receives the one or more executable commands and executes an event in response to the received control commands. In one embodiment, the event comprises simulating a function corresponding to the remote control command received at the display device 110 through remote control device 150. In one or more embodiments the event comprises a mouse or keyboard event causing the active media player to simulate a function typically performed by a mouse or keyboard input at the computing device.

For example, when simulating control of the mouse, remote control inputs such as navigation key inputs are detected at the display device and sent to the computing system as TCP data. The data is converted into Windows or other platform specific mouse events using system calls such as mouse_even( ) to simulate playback or control functions typically performed through inputs received through the mouse, e.g. to navigate and/or click on the computing system screen. Similarly, when controlling or simulating functions performed by the computer keyboard, remote control inputs are detected at the display device and sent to the computing system as TCP data. The data is converted into Windows or other platform specific keyboard events using system calls such as keyboard_even( ) to simulate a playback function typically performed through inputs received through the keyboard.

Using the determined commands the present system enables control of computing system media playback using the display device's remote control. This application thus ensures that a user accessing media from their computing system 120 using means such as HDMI/VGA/S-Video to control playback of such media through interaction with the display device rather than the computing system, while watching media content.

Next, in some embodiments, upon completing the one or more commands the process continues to step 570 and the computing system may issue an acknowledgment message and may forward the acknowledgment message to the display device. In one embodiment, the acknowledgment message may indicate whether the media player command was received and further whether it was successful.

Figure 6A:
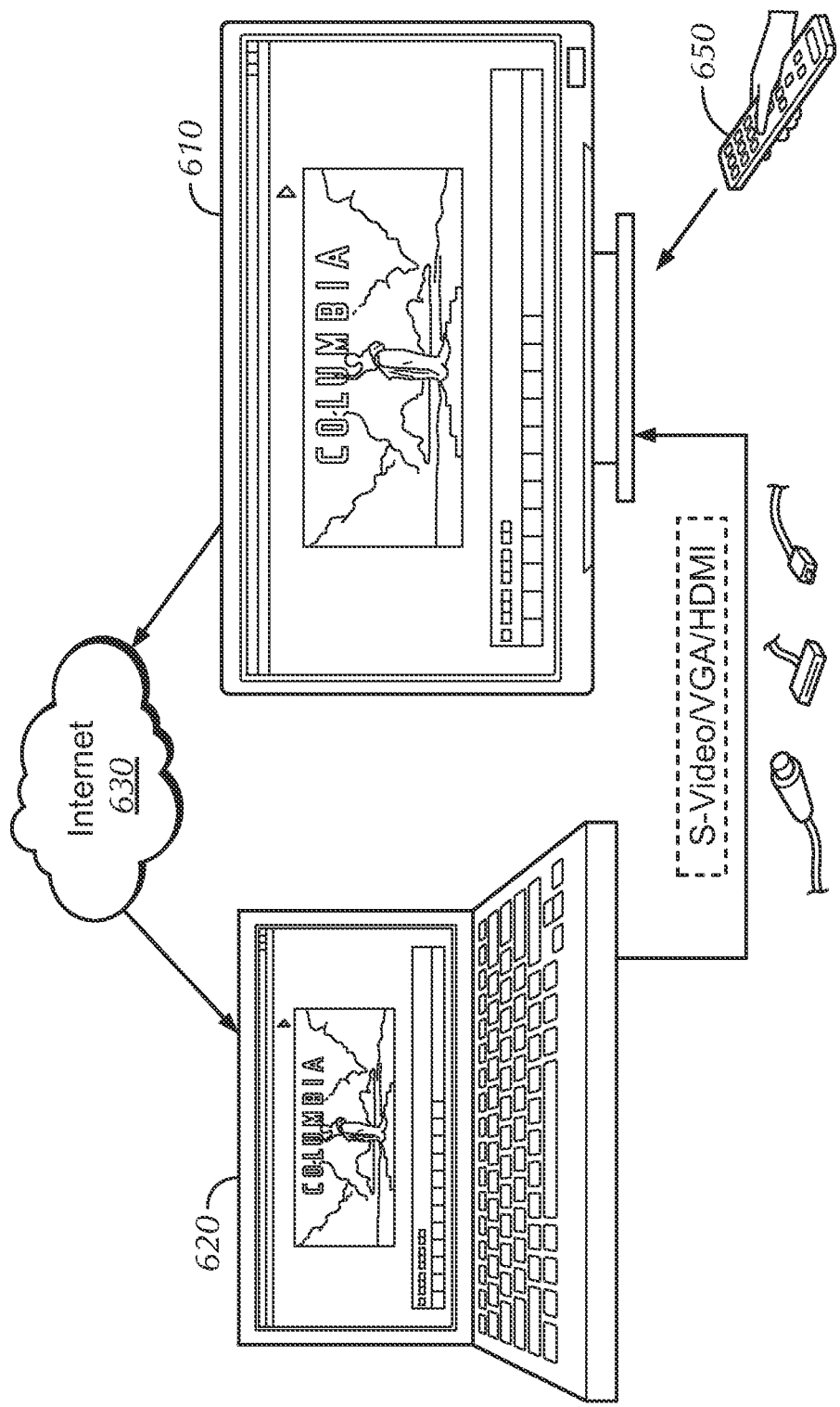
FIGS. 6a and 6b are exemplary embodiments of the methods and apparatuses described above, according to several embodiments of the present invention.

Referring to FIG. 6a, an exemplary embodiment of the methods and apparatuses described above is illustrated. As illustrated, according to the exemplary embodiment, Media rendering control command Play is issued by the television remote 650, The remote control signals, e.g. SIRCS, received at the television 610 are converted into TCP data and sent to the computer 620 (computing system) over network 630 using the socket created according to the several embodiments described above. The command client on the computer 620 identifies the media player application currently running (e.g., WMP, VLC) and brings the application's interface to the foreground, and the play function is carried out on the active media player.

Figure 6B:
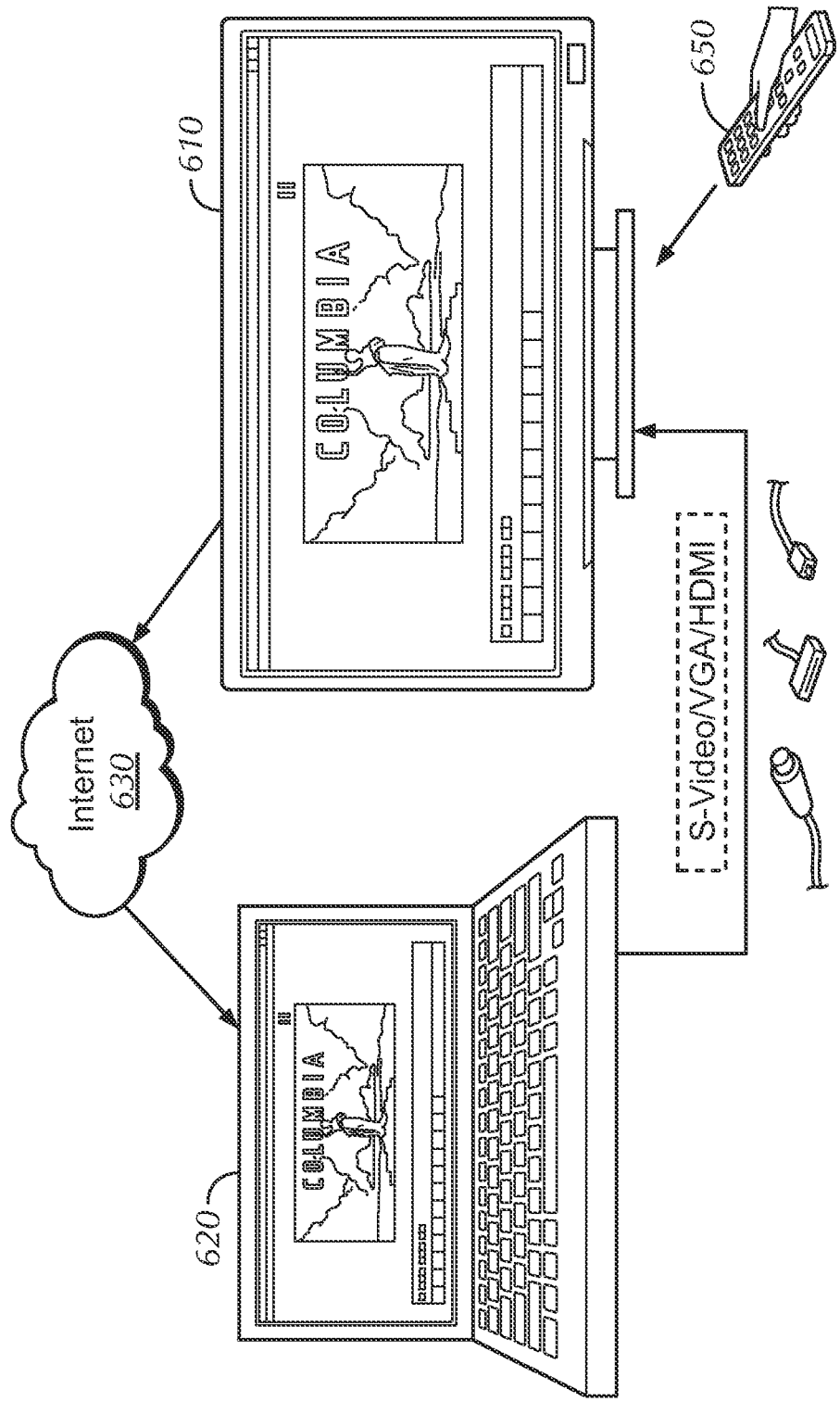

Similarly FIG. 6b illustrates another exemplary embodiment of the methods and apparatuses described above. As shown, Media rendering control command Pause is issued by the television remote 650. The remote control signals, e.g. SIRCS, received at the television 610 are converted into TCP data and sent to the computer 620 over network 630 using the socket created according to the several embodiments described above. The command client on the computer 620 identifies the media player application currently running (e.g., WMP, VLC) and brings the application's interface to the foreground, and the pause function is carried out on the active media player.

Figure 8:
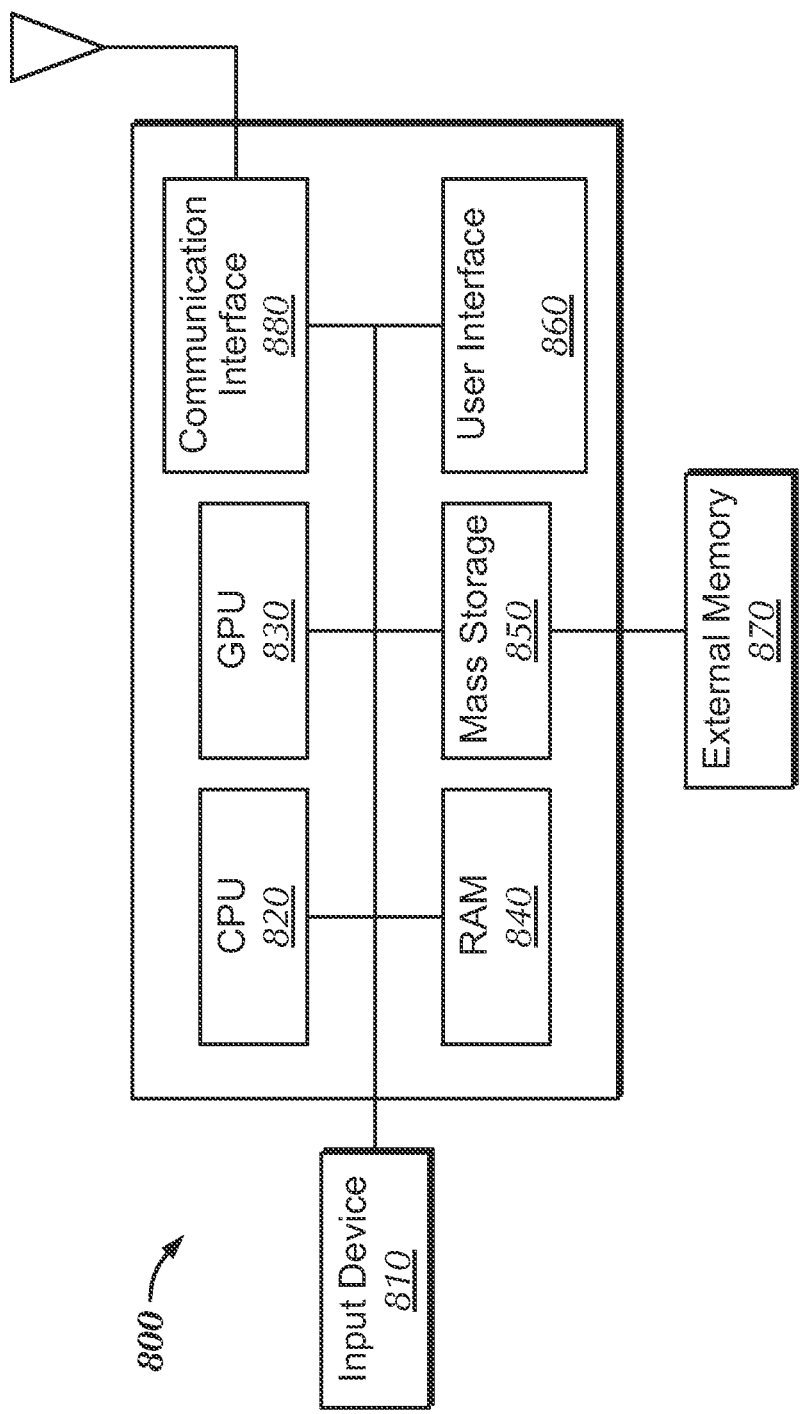
FIG. 8 is a block diagram illustrating a processor-based system that may be used to run, implement and/or execute the methods and/or techniques shown and described herein according to several embodiments of the present invention.

The methods and techniques described herein may be utilized, implemented and/or run on many different types of systems. Referring to FIG. 8, there is illustrated a system 800 that may be used for any such implementations. One or more components of the system 800 may be used for implementing any system or device mentioned above, such as for example any of the above-mentioned display devices, computing devices, applications, modules, servers, databases, etc. However, the use of the system 800 or any portion thereof is certainly not required.

By way of example, the system 800 may comprise a Central Processing Unit a User Input Device 810, (CPU) 820, a Graphic Processing Unit (GPU) 830, a Random Access Memory (RAM) 840, a mass storage 850, such as a disk drive, a user interface 860 such as a display External Memory 870, and Communication Interface 880. The CPU 820 and/or GPU 830 may be used to execute or assist in executing the steps of the methods and techniques described herein, and various program content, images, games, simulations, representations, communities, interfaces, etc. may be rendered on the user interface 860. The system 800 may further comprise a user input device 810. The user input device may comprise any user input device such a keyboard, mouse, touch pad, game controller, etc.

Furthermore, the system 800 may comprise a communication interface 880 such as a communication port for establishing a communication with one or more other processor-based systems and receiving one or more content. In one embodiment, the communication interface 880 may further comprise a transmitter for transmitting content, messages, or other types of data to one or more systems such as external devices, applications and/or servers. The system 800 comprises an example of a processor-based system.

The mass storage unit 850 may include or comprise any type of computer readable storage or recording medium or media. The computer readable storage or recording medium or media may be fixed in the mass storage unit 850, or the mass storage unit 850 may optionally include external memory and/or removable storage media 870, such as a digital video disk (DVD), Blu-ray disc, compact disk (CD), USB storage device, floppy disk, or other media. By way of example, the mass storage unit 850 may comprise a disk drive, a hard disk drive, flash memory device, USB storage device, Blu-ray disc drive, DVD drive, CD drive, floppy disk drive, etc. The mass storage unit 850 or external memory/removable storage media 870 may be used for storing code that implements the methods and techniques described herein.

Thus, external memory and/or removable storage media 870 may optionally be used with the mass storage unit 850, which may be used for storing code that implements the methods and techniques described herein, such as code for generating and storing the tag data described above, performing the initiation of a session, evaluating, and matching of the users. However, any of the storage devices, such as the RAM 840 or mass storage unit 850, may be used for storing such code. For example, any of such storage devices may serve as a tangible computer readable storage medium for embodying a computer program for causing a console, system, computer, computing system or other processor based system to execute or perform the steps of any of the methods, code, and/or techniques described herein. Furthermore, any of the storage devices, such as the RAM 840, mass storage unit 850 and/or external memory 870, may be used for storing any needed database(s), tables, content, etc.

In some embodiments, one or more of the embodiments, methods, approaches, and/or techniques described above may be implemented in a computer program executable by a processor-based system. By way of example, such processor based system may comprise the processor based system 800, or a television, mobile device, tablet computing device, computer, computing system, entertainment system, game console, graphics workstation, etc. Such computer program may be used for executing various steps and/or features of the above-described methods and/or techniques. That is, the computer program may be adapted to cause or configure a processor-based system to execute and achieve the functions described above.

For example, such computer program may be used for implementing any embodiment of the above-described steps or techniques for generating tag data and matching players based on the tag data, etc. As another example, such computer program may be used for implementing any type of tool or similar utility that uses any one or more of the above described embodiments, methods, approaches, and/or techniques. In some embodiments, program code modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein.

Therefore, in some embodiments the present invention provides a computer program product comprising a medium for embodying a computer program for input to a computing system and a computer program embodied in the medium for causing the computing system to perform or execute steps comprising any one or more of the steps involved in any one or more of the embodiments, methods, approaches, and/or techniques described herein.

For example, in some embodiments the present invention provides a computer-readable storage medium storing a computer program for use with a computer simulation, the computer program adapted to cause a processor based system to execute steps comprising: establishing a connection with a first processor-based device at a second processor-based device, receiving through the connection a control command from the first processor-based device implemented according to a first protocol, wherein the command corresponds to a remote control command received through a remote control device at the first processor-based device, translating the control command from the first protocol to a second protocol executable at the second processor-based device and executing an event in response to the control command having been translated into the second protocol.

Thus the present system enables control of computing system media playback using the display device's remote control. This application thus ensures that a user accessing media from their computing system using means such as HDMI/VGA/S-Video to control playback of such media through interaction with the display device rather than the computing system, while watching media content.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method comprising:
    establishing a connection with a first processor-based device at a second processor-based device;
    receiving through the connection a control command from the first processor-based device implemented according to a first protocol, wherein the control command corresponds to a remote control command received through a remote control device at the first processor-based device and includes a command for controlling playback of media content on the first processor-based device;
    translating the control command from the first protocol to a second protocol executable at the second processor-based device;
    executing, at the second processor-based device, an event controlling the playback of the media content in response to the control command having been translated into the second protocol;
    transporting the media content from the second processor-based device to the first processor-based device through a content transport connection separate from the connection; and
    sending, over the connection that is separate from the content transport connection, an acknowledgement message to the first processor-based device indicating successful execution of the event controlling the playback of the media content, the sending of the acknowledgement message from the second processor-based device to the first processor-based further including determining by the first processor-based device whether the event controlling the playback of the media content was successfully executed and displaying a notification on the first processor-based device that the control command was not successful upon a determination by the first processor-based device that the acknowledgment message indicates that the event controlling the playback of the media content was not successfully executed.

2. The method of claim 1, wherein the event comprises simulating a function at the second processor-based device corresponding to the remote control command received at the first processor-based device.

3. The method of claim 1, wherein translating the control command comprises:
    detecting an active media player application running at the second processor-based device; and
    translating the control command to execute the event for the active media player application.

4. The method of claim 1, wherein establishing the connection comprises establishing a TCP connection.

5. The method of claim 1, wherein the event comprises a mouse event causing the second processor-based device to simulate a function typically performed by a mouse at the second processor-based device.

6. The method of claim 1, further comprising:
    receiving the remote control command at the first processor-based device; and
    sending the control command corresponding to the remote control command over the connection to the second processor-based device.

7. The method of claim 6, wherein sending the control command comprises:
    translating the remote control command implemented in a remote control signaling protocol to the control command.

8. The method of claim 1, wherein the first processor-based device is configured to execute the control command implemented in the first protocol.

9. The method of claim 1, wherein the first processor-based device comprises a television and the second processor-based device comprises a personal computer.

10. The method of claim 1, wherein the executing an event controlling the playback of the media content further includes displaying the media content on both the second processor-based device and the first processor-based device and one of:
- executing a pause command to pause the playback of the media content on both the second processor-based device and the first processor-based device; and
- executing a play command to start the playback of the media content on both the second processor-based device and the first processor-based device.

\* \* \* \* \*